United States Patent [19]
Middleton, Jr.

[11] Patent Number: 6,138,660
[45] Date of Patent: *Oct. 31, 2000

[54] FORCED CONVECTIVE TRACK OVEN HAVING OVAL SPIRALS

[75] Inventor: Robert W. Middleton, Jr., Plano, Tex.

[73] Assignee: Sasib Bakery North America, Inc., Plano, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/227,218

[22] Filed: Jan. 6, 1999

[51] Int. Cl.$^7$ .............................. A21B 1/00; F24C 15/32
[52] U.S. Cl. .................. 126/21 A; 126/21 R; 99/443 C; 432/133; 432/176; 432/199
[58] Field of Search .......................... 126/21 A, 21 R; 34/216; 99/443 C, 443 R, 447, 355, 246; 432/133, 128, 199, 176

[56] References Cited

U.S. PATENT DOCUMENTS

| | | | |
|---|---|---|---|
| 4,544,352 | 10/1985 | Lanham et al. | 432/133 |
| 4,608,961 | 9/1986 | Lanham et al. | 126/21 A |
| 4,631,029 | 12/1986 | Lanham et al. | 126/21 A |
| 4,726,766 | 2/1988 | Stewart et al. | 432/72 |
| 5,010,808 | 4/1991 | Lanham | 99/443 C |
| 5,329,916 | 7/1994 | Lygum | 126/21 A |
| 5,741,536 | 4/1998 | Mauer et al. | 99/443 C |
| 5,756,133 | 5/1998 | Duggan et al. | 99/443 C |
| 6,065,463 | 5/2000 | Martin | 126/21 A |

FOREIGN PATENT DOCUMENTS 2242605  10/1991  United Kingdom .

*Primary Examiner*—James C. Yeung
*Attorney, Agent, or Firm*—Michael A. O'Neil

[57] ABSTRACT

A forced convective track oven comprises a track conveyor including first and second circular spirals, the first circular spiral for conveying bakery trays and dough products upwardly and the second circular spiral portion for conveying bakery trays and dough products downwardly, thereby minimizing the number of changes of direction of the bakery trays as they travel along the track conveyor. A plurality of burners discharge heated air through discharge tubes and discharge nozzles into engagement with bakery trays carried by the track conveyor. First and second oval spirals may be used in lieu of the circular spirals when the track oven is used in a reduced ceiling height environment.

1 Claim, 6 Drawing Sheets

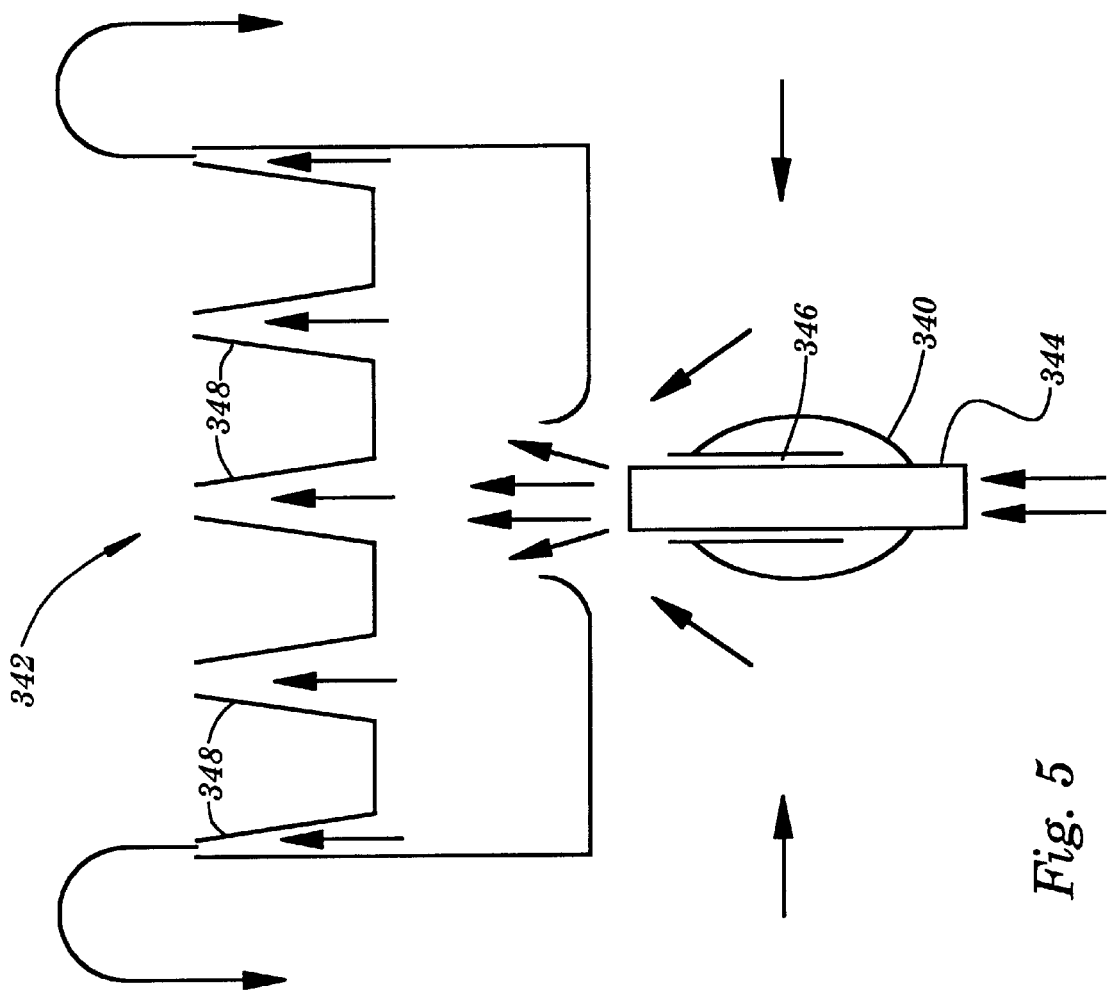

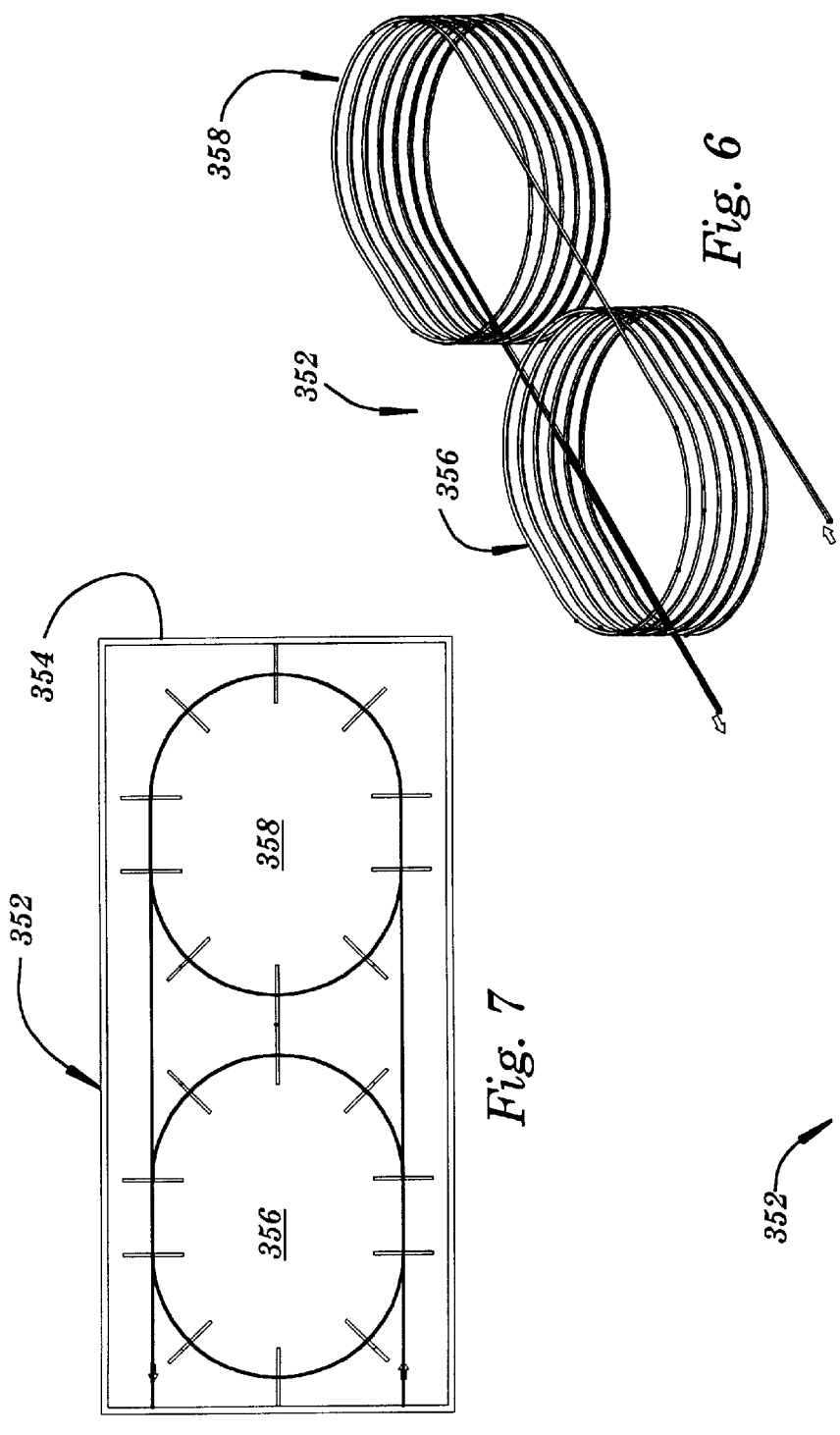

FORCED CONVECTIVE TRACK OVEN HAVING OVAL SPIRALS

TECHNICAL FIELD

This invention relates generally to track ovens of the type utilized in automated bakeries and similar applications, and more particularly to a forced convective heating system for track ovens and to a unique track oven configuration.

BACKGROUND AND SUMMARY OF THE INVENTION

Modern automated bakeries typically employ track ovens for the baking of bread, buns, rolls, and other bakery products. In a track oven, a track extends through a bakery enclosure, and a drive chain extends through the track and supports spaced apart conveyor grids. The grids receive and transport bakery pans and trays.

In the operation of a track oven, dough products are received on the trays which are then loaded onto the grids of the track oven. The grids and the dough-laden trays carried thereby are transported through the oven enclosure which is heated by ribbon burners. Air circulation apparatus may be utilized within the oven enclosure to provide a more even temperature distribution therein. The length of the track conveyor and the speed of operation thereof are regulated so that baking of the dough products is completed during transportation thereof through the oven.

Track ovens typically comprise spiral configurations having elongated side portions to accommodate the ribbon burners. U.S. Pat. No. 4,726,766, granted to Stewart, et al. on Feb. 23, 1988, discloses a track oven having an inner ascending spiral and an outer descending spiral which allows both the conveyor inlet and the conveyor outlet to be at the level of the lowest conveyer tier. The '766 Patent also discloses an air circulation system that receives heated air from the upper region of the oven enclosure and discharges the heated air onto portions of the track conveyor that are physically separated from the ribbon burners.

The primary heating mechanism of track ovens utilizing ribbon burners is radiant heating from the burner flame. Radiant heating is notoriously inefficient as compared with the much more efficient heat transfer that can be achieved utilizing forced convection heating. However, it has not heretofore been possible to provide forced convection heating in track ovens due to the very large size of the conveyors and the surrounding oven enclosures which are required in order to provide the through-put rates required of modern bakeries.

The present invention comprises a forced convection track open oven which overcomes the foregoing and other problems that have long since characterized the prior art. In accordance with one aspect of the invention, a track oven is provided with a plurality of burners, each associated with a particular zone within the oven. The burners produce heated air that is discharged through a plurality of discharge tubes and an associated discharge nozzle. Fans are employed to circulate previously heated air through the burners, and the discharge tube/discharge nozzle structure functions to combine cooler used air with hot primary air for discharging into engagement with the bakery pans that are transported by the track conveyor.

In accordance with another aspect of the invention, the track conveyor comprises two circular spirals, one ascending and one descending. The use of circular spirals is advantageous is reducing the likelihood of pan jamming that has characterized prior track oven designs. Perhaps more importantly, the use of the circular spiral configuration in combination with discharge tubes and discharge nozzles to effect heating allows the use of distinct zones within the oven, thereby affording better control over the baking process.

In accordance with yet another aspect of the invention, the track conveyor comprises two oval spirals, one ascending and one descending. The use of oval spirals is advantageous in those circumstances in which the required conveyor track length cannot be accommodated using circular spirals due to reduced ceiling height. In such circumstances the use of oval spirals is advantageous in providing extended track length in a reduced height environment.

BRIEF DESCRIPTION OF THE DRAWINGS

A more complete understanding of the present invention may be had by reference to the following Detailed Description when taken in connection with the accompanying Drawings wherein:

FIG. 5 is an illustration of the discharge tubes and discharge nozzles of the forced convective track oven of FIGS. 3 and 4;

FIG. 6 is a perspective view of an oval track configuration useful in the practice of the invention;

FIG. 7 is a top view of the oval track configuration of FIG. 6; and

FIG. 8 is a side view of the oval track configuration of FIG. 6.

DETAILED DESCRIPTION

Figure 1:
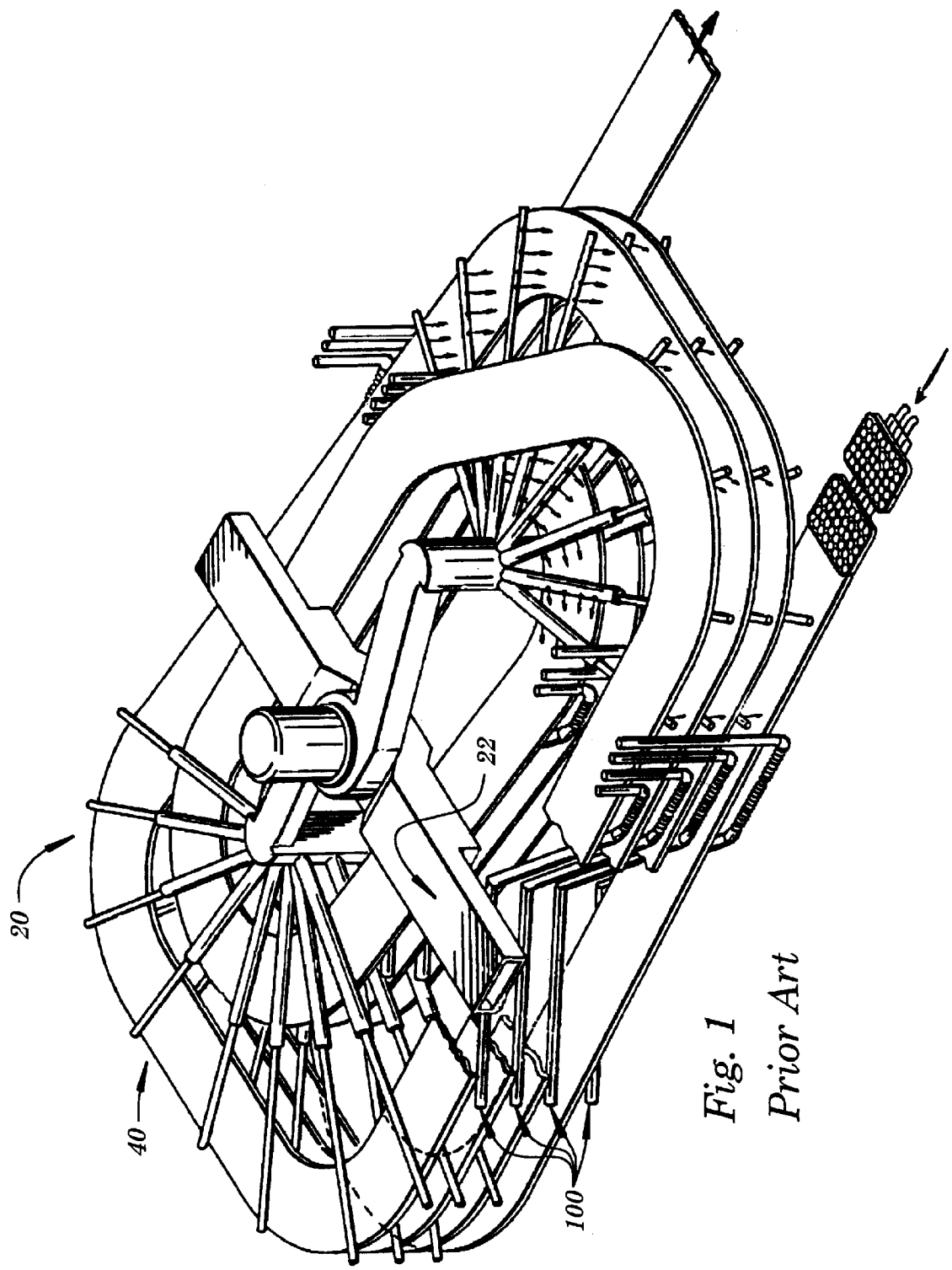
FIG. 1 is a prospective view of a prior art track oven.
Figure 2:
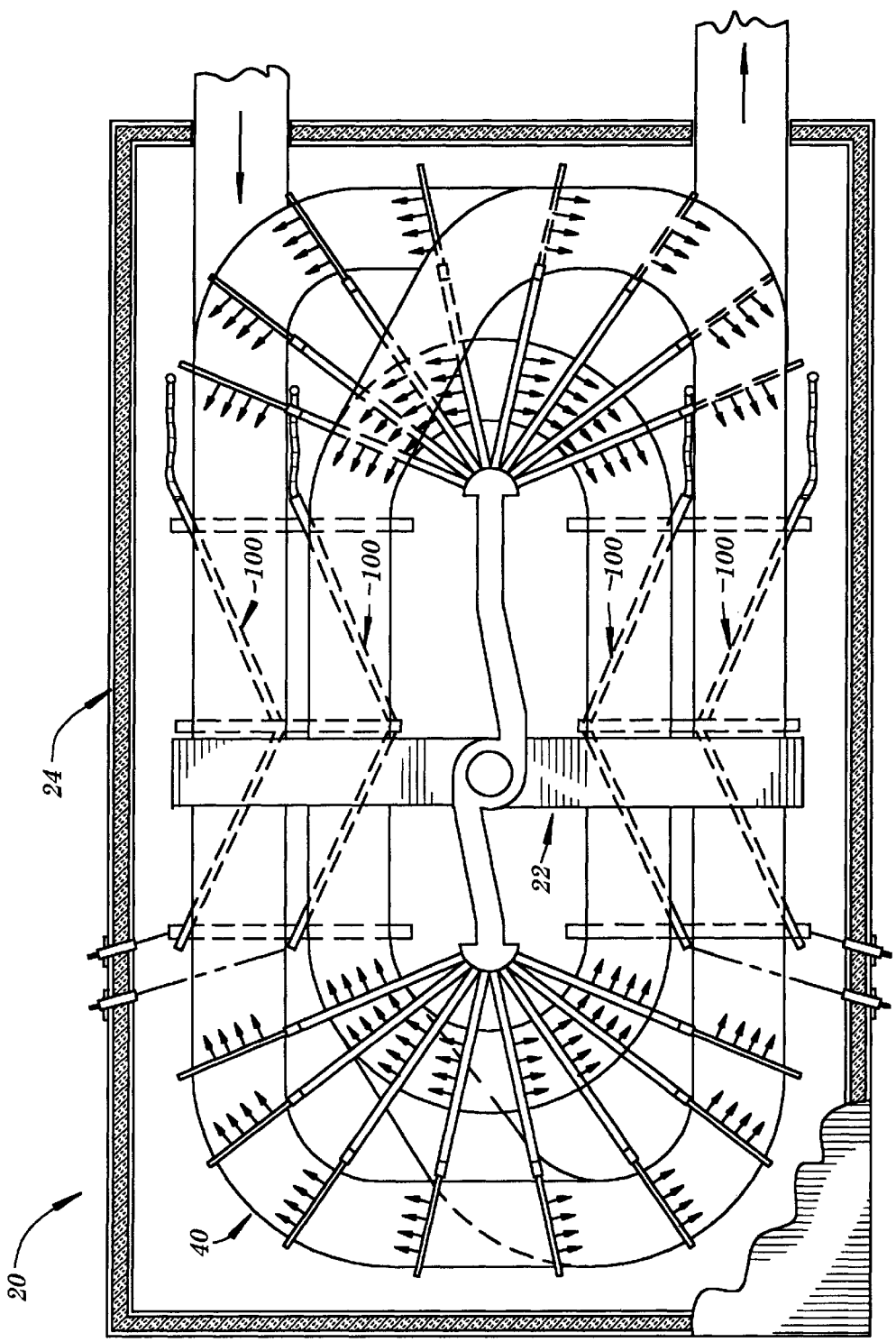
FIG. 2 is a top view of the track oven of FIG. 1.

Referring now to the Drawings, and particularly to FIGS. 1 and 2 thereof, there is shown a prior art track oven 20 of the type disclosed in U.S. Pat. No. 4,726,766, granted to Stewart, et al. on Oct. 23, 1988. The oven 20 includes an enclosure 24 and a track conveyor 40 situated within the enclosure 24. A plurality of ribbon burners 100 are utilized to heat and bake dough products which are transported through the interior of the enclosure 24 by the track conveyor 40. An air circulation and exhaust control system 22 is utilized to recover heated air from the upper regions of the enclosure 24 and to circulate the heated air to portions of the track conveyor 40 which are physically separated from the ribbon burners 100.

Figure 3:
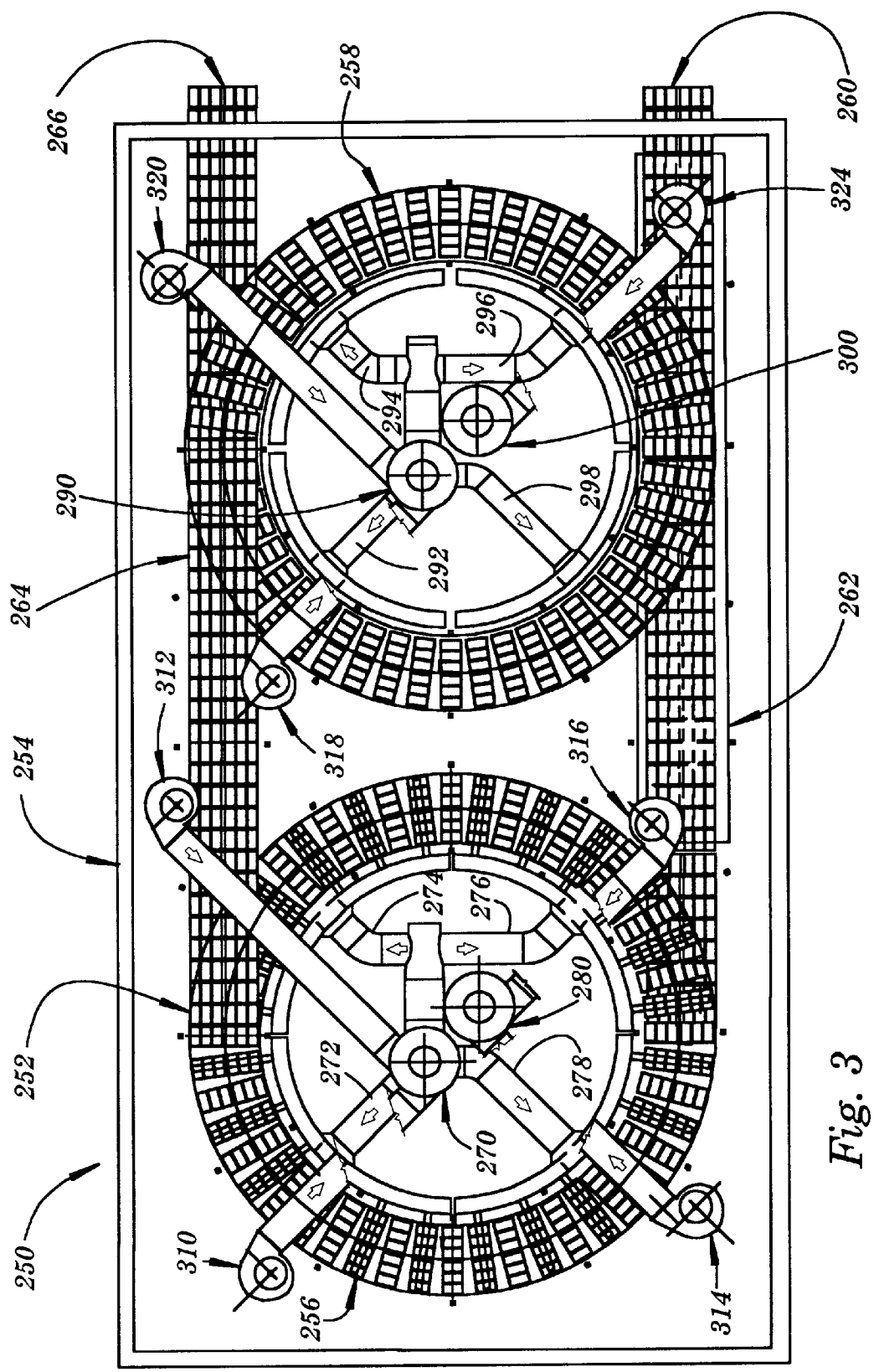
FIG. 3 is a top view of a forced convective track oven incorporating the present invention.
Figure 4:
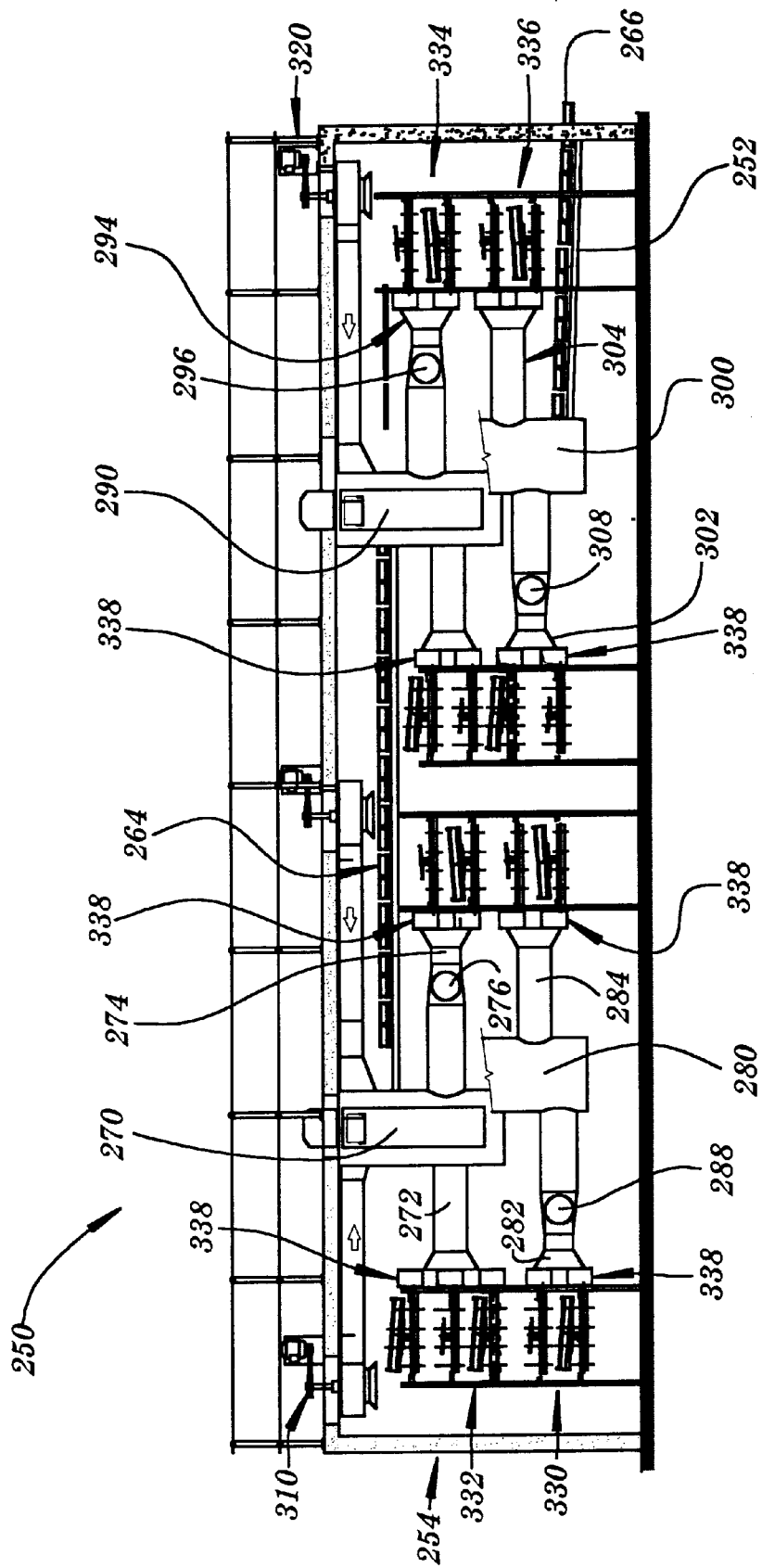
FIG. 4 is a longitudinal sectional view of the forced convective track oven of FIG. 3.

Referring to FIGS. 3, 4, and 5, there is shown a forced convective oven 250 incorporating the present invention. The oven 250 comprises a track conveyor 252 situated within an oven enclosure 254. The conveyor 252 differs from the conveyors utilized in prior art track ovens in that it comprises a first ascending circular spiral 256 and a second descending circular spiral 258.

In the operation of the forced convective track oven 250, dough products to be baked are carried by trays that are transported by the conveyor 252 into the oven enclosure 254 through an inlet 260. The inlet 260 is situated at the level of the lowest tier of the conveyor 252. The trays and the dough products carried thereby are transported from the inlet 260 to the first ascending circular spiral 256 by a longitudinally extending section 262 of the conveyor 252. The ascending circular spiral 256 of the conveyor 252 carries the trays and the dough products carried thereby upwardly through a series of tiers, and ultimately discharges the trays and the dough products carried thereby onto a transfer portion 264 of the conveyor 252. The transfer portion 264 transfers the trays and the dough products carried thereby from the ascending circular spiral 256 of the conveyor 252 to the descending circular spiral 258 thereof. The descending circular spiral 258 of the conveyor 252 transports the trays and the dough products carried thereby downwardly through a series of tiers, and ultimately discharges the trays and the now-baked dough products carried thereby through an outlet 266.

The use of a track conveyor having circular spirals is highly advantageous in the operation of the forced convective track oven 250. Prior art track ovens have utilized track conveyors having side portions which are elongated to accommodate ribbon burners. This in turn necessitates changes in the direction of movement of the trays carried by the conveyor at each end of the oval configuration thereof. Each such change of direction involves at least the possibility of pan jamming. This problem is overcome by means of the track conveyor configuration of the present invention wherein the trays carried by the conveyor change direction only at the inlets to and outlets from the circular spirals of the track conveyor.

The forced convective track oven 250 comprises 4 zones which are individually controllable in accordance with the baking requirements of the dough products which are transported through the oven 250 at any particular time. Zone 1 comprises the lower tiers of the ascending circular spiral 256 of the conveyor 252; Zone 2 comprises the upper tiers of the ascending circular spiral 256 of the conveyor 252; Zone 3 comprises the upper tiers of the descending circular spiral 258 of the conveyor 252; and Zone 4 comprises the lower tiers of the descending circular spiral portion 258 of the conveyor 252. A burner 270 directs heated air to Zone 2 of the oven 250 through four outlet tubes 272, 274, 276, and 278, each associated with a particular quadrant of the ascending circular spiral 256. A burner 280 directs heated air to Zone 1 of the oven 250 through 4 similar outlet tubes 282, 284, 286, and 288 (omitted in FIG. 3 for clarity), each associated with a particular quadrant of the ascending circular spiral 256 of the conveyor 252.

A burner 290 supplies heated air to Zone 3 of the oven 250 through a series of outlet tubes 292, 294, 296, and 298, each associated with one quadrant of the descending circular spiral 258 of the conveyor 252. A burner 300 directs heated air to Zone 4 of the oven 250 through 4 discharge tubes 302, 304, 306, and 308 (omitted in FIG. 3 for clarity), each associated with one quadrant of the descending circular spiral portion 258 of the conveyor 252. Fans 310 and 312 intake previously heated air from the upper regions of the oven enclosure 354 and direct the heated air to the burner 270 for recirculation to Zone 2 of the oven 250. Likewise, fans 314 and 316 intake previously heated air from the upper regions of the oven enclosure 254 and direct the heated air to the burner 280 for recirculation to Zone 1 of the oven 250. Fans 318 and 320 receive previously heated air from the upper regions of the oven enclosure 254 and direct the heated air to the burner 290 for recirculation to Zone 3 of the oven, and fans 322 (omitted in FIG. 3 for clarity) and 324 receive heated air from the upper portion of the oven enclosure 254 and direct the heated air to burner 300 for recirculation to Zone 4 of the oven 250.

Referring now to FIG. 2, reference numerals 330, 332, 334, and 336 identify Zones 1, 2, 3, and 4, respectively of the oven 250. Each of the outlet tubes 272–278, 282–288, 292–298, and discharge tubes 302–308 extends to a plenum 338 which is individual to one quadrant of one of the zones comprising the oven 250. Each plenum 338 has a plurality of discharge tubes 340 extending therefrom. The number of discharged tubes extending from a particular plenum depends on the requirements of particular applications of the invention, however, in most instances each plenum 338 will have between about 30 and about 50 discharge tubes 340 extending therefrom.

Referring to FIG. 5, the discharge tubes 340 extend to discharge nozzle assemblies 342. At the location of each discharge nozzel assembly 342, a passageway tube 344 extends through the discharge tube 340. A passageway 346 surrounds the tube 344 and comprises an outlet from the discharge tube 340 which causes an upward flow of hot primary air from the discharge tube 340 to the discharge nozzle assembly 342.

The upward flow of hot primary air from the discharge tube 340 creates a venturi which draws cooler used air into the upwardly directed stream of hot primary air from two sources. One source exists below the tube 340 and enters the upwardly flowing stream through the tube 344. The second source comprises cooler used air discharged from upwardly directed nozzles 348 of the discharge nozzle assembly 342. Thus, the nozzles 348 discharge a mixture of hot primary air and cooler used air upwardly toward the bakery trays carried on the tier of the conveyor 252 located next above the particular discharge nozzle assembly 342.

Referring now to FIGS. 6, 7, and 8, there is shown a conveyor 352 useful in the practice of the invention in those instances in which the conveyor is situated in a building having reduced ceiling height. In a reduced ceiling height environment, it may not be possible to achieve the necessary conveyor length using ascending and descending circular spirals. By substituting oval spirals, the required conveyor length can be achieved in a reduced ceiling height environment.

The conveyor 352 is situated in an oven enclosure 354 and includes an ascending spiral 356 and a descending spiral 358. Otherwise, the construction and operation of the conveyor 352 is identical to the construction and operation of the conveyor 252 illustrated in FIGS. 3, 4, and 5, and described hereinabove in conjunction therewith.

The practice of the present invention incorporates two distinct advantages. First, rather than utilizing ribbon burners to heat dough products primarily by radiation, the present invention uses a plurality of burners and a discharge structure extending therefrom to heat the dough products by forced convection. Secondly, the use of a conveyor assembly comprising either two circular spirals or two oval spirals substantially reduces the likelihood of pan jamming in the operation of the system.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

I claim:

1. A track oven comprising:
    first and second oval conveyor spirals including a chain having grids mounted thereon which receive and transport bakery pans having dough products received therein:

a first ascending oval spiral conveyor portion for receiving bakery trays carrying dough products and for transporting the bakery trays and the dough products upwardly through a plurality of tiers, a second descending oval spiral conveyor portion for receiving the bakery trays from the first ascending oval spiral and for transporting the trays and the bakery products downwardly through a plurality of tiers, a transfer conveyor portion for directing bakery trays and dough products from the first ascending oval spiral to the second descending oval spiral, the second descending oval spiral being laterally spaced apart from the first ascending oval spiral, a plurality of burners each associated with a particular zone within the oven, and apparatus for directing heated gasses from the burners onto the bakery pans carried by the ascending and descending oval spiral conveyor portions, thereby baking the dough products carried by the bakery trays;

the heated gas directing apparatus comprising a plurality of discharge tubes each for receiving hot primary air from one of the burners and a plurality of discharge nozzles for receiving hot primary air from the discharge tubes, for mixing the hot primary air with cooler used air, and for directing the air mixture onto the bakers pans.

\* \* \* \* \*